UNITED STATES PATENT OFFICE.

THOMAS PRICE, OF PITTSBURG, PENNSYLVANIA, ASSIGNOR TO HIMSELF AND JOHN D. BURTON, OF SAME PLACE.

IMPROVEMENT IN COMPOSITION PAVEMENTS.

Specification forming part of Letters Patent No. 124,509, dated March 12, 1872.

*To all whom it may concern:*

Be it known that I, THOMAS PRICE, of Pittsburg, in the county of Allegheny and State of Pennsylvania, have invented a new and Improved Carbonized Rock Asphalt Pavement; and I do hereby declare that the following is a full, clear, and exact description thereof, which will enable others skilled in the art to make and use the same.

This invention relates to a new method of making asphalt pavements of carbonized rock —that is to say, of broken rock whose pores have been filled with asphalt, tar, or other carboniferous material. It is intended, therefore, to produce a pavement every particle of which shall be air and water proof, and whose hard ingredients will readily and instantly combine with the binding material.

The invention consists in the use of a compound prepared as follows: Rock of suitable kind, preferably lime-rock, is broken into pieces of convenient size, and then in a suitable vessel exposed to heat. Its pores are thereby opened, and it is prepared for the reception of the asphaltum, tar, or equivalent matter. The latter, being mixed with the heated rock, penetrates the pores and envelops the several pieces so as to make them thoroughly air and water proof. During the process of heating the rock was liberated of all gaseous matter and properly prepared for the reception of the asphaltum and tar. The rock, after having cooled, is reheated, and more tar or asphaltum added, which may be mixed with a small quantity of plaster of Paris, some oxide of zinc or iron, and some disinfecting powder for destroying the smell and noxious vapors.

This composition should be spread three and a half or four inches thick upon a bed of gravel or other material, and then pressed by hot and heavy rollers until quite firm. It will prove a durable pavement, which is easily put down, and as easily taken up and replaced when necessary. The more it is compressed by wear the stronger it will become.

Having thus described my invention, I claim as new, and desire to secure by Letters Patent—

The process of expanding broken rock with a high heat until the gases are expelled and the pores opened, and then pouring thereon liquid asphalt, as described, to form an improved paving material of carbonized rock.

THOMAS PRICE.

Witnesses:
   THOS. SIMPSON,
   H. C. MACKULL.